(12) United States Patent
Göser

(10) Patent No.: US 8,479,888 B2
(45) Date of Patent: Jul. 9, 2013

(54) TRACTION DEVICE

(75) Inventor: Hubert Göser, Dannenberg (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 624 days.

(21) Appl. No.: 12/588,867

(22) Filed: Oct. 30, 2009

(65) Prior Publication Data

US 2010/0044158 A1 Feb. 25, 2010

Related U.S. Application Data

(63) Continuation of application No. PCT/EP2008/053729, filed on Mar. 28, 2008.

(30) Foreign Application Priority Data

May 8, 2007 (DE) .................... 10 2007 021 434

(51) Int. Cl.
*B66B 11/08* (2006.01)
*F16G 1/22* (2006.01)
*F16G 1/28* (2006.01)
*F16G 9/00* (2006.01)

(52) U.S. Cl.
USPC ............ 187/255; 474/240; 474/252; 474/264

(58) Field of Classification Search
USPC ................. 187/255, 251; 474/203–205, 247, 474/252, 260, 270, 238, 240, 264
IPC .............................. F16G 1/08,1/28; B66B 7/06
See application file for complete search history.

(56) References Cited

U.S. PATENT DOCUMENTS

| 3,404,577 | A | * | 10/1968 | Zahn | 474/148 |
| 4,266,396 | A | * | 5/1981 | Thomson | 57/221 |
| 6,371,448 | B1 | * | 4/2002 | De Angelis | 254/374 |
| 6,508,051 | B1 | * | 1/2003 | De Angelis | 57/223 |

(Continued)

FOREIGN PATENT DOCUMENTS

| DE | 1 406 220 | | 10/1968 |
| DE | 3411772 A1 | * | 5/1985 |

(Continued)

*Primary Examiner* — William A Rivera
*Assistant Examiner* — Stefan Kruer
(74) *Attorney, Agent, or Firm* — Walter Ottesen, P.A.

(57) ABSTRACT

The invention relates to a traction device (1), especially for an elevator system. The traction device (1) is driveable by a traction sheave. The task which is the basis of the invention is to provide a traction device which is simple to manipulate. High tension forces are transferable and the traction device makes possible a drive unit of lesser width compared to the known belt technology. For this purpose, the traction device is configured as a composite rope (1) wherein individual tension carriers (2, 3) are connected to each other via a one-sided elastomer connecting layer (4). The individual tension carriers (2, 3) lie in parallel and are jacketed with elastomeric material. The tension carriers (2, 3) engage in corresponding grooves (13) of the traction sheave (10). The tension carriers (2, 3) engage in the grooves (13) of the traction sheave (10) with at least 25% of their total diameter.

24 Claims, 3 Drawing Sheets

U.S. PATENT DOCUMENTS

| | | |
|---|---|---|
| 6,739,433 B1 | 5/2004 | Baranda et al. |
| 2004/0262087 A1* | 12/2004 | Ach ............................... 187/264 |
| 2011/0226562 A1* | 9/2011 | Goser ............................ 187/411 |
| 2011/0226563 A1* | 9/2011 | Goser ............................ 187/411 |
| 2011/0240408 A1* | 10/2011 | Wesson et al. ................. 187/251 |
| 2012/0329591 A1* | 12/2012 | Goeser et al. .................. 474/238 |

FOREIGN PATENT DOCUMENTS

| | | |
|---|---|---|
| DE | 102007031092 A1 * | 1/2009 |
| EP | 1 396 458 | 3/2004 |
| EP | 1 396 659 | 3/2004 |
| JP | 09228277 A * | 9/1997 |

* cited by examiner

TRACTION DEVICE

CROSS REFERENCE TO RELATED APPLICATIONS

This application is a continuation application of international patent application PCT/EP 2008/053729, filed Mar. 28, 2008, designating the United States and claiming priority from German application 10 2007 021 434.2, filed May 8, 2007, and the entire content of both applications is incorporated herein by reference.

FIELD OF THE INVENTION

The invention relates to a traction device especially for an elevator system with the traction device being driven by a traction sheave.

BACKGROUND OF THE INVENTION

Traction devices for elevator systems are known per se. Ropes as well as belts are often used and as belts, flat belts, multiple V-ribbed belts or even toothed belts are utilized.

For ropes as traction devices, each individual rope is clearly assigned its own rope groove on the traction sheave. Each rope engages into the corresponding rope groove by at least a portion of its diameter. Each individual rope is an independent traction element and can also be driven individually. For higher loads, either several ropes can be used in parallel or the rope diameter is correspondingly increased. The individual rope is therefore not only traction means for transferring the tension forces but also participates directly in the transfer of the traction forces.

Compared to belt technology, ropes afford the advantage that the force is directly transferable from the traction sheave to the rope. In belt technology, the connecting elastomer material lies between the actual tension carriers and the traction sheave.

When belts are used, several mutually adjacent lying ropes as traction elements are always embedded in a common belt body. The traction elements are completely encased in the basic material of the belt body and the plane of the traction element lies above the contact plane which the belt forms with the corresponding belt sheave. In toothed belts, the belt teeth can be viewed as the contact plane and in V-ribbed belts, the wedge plane can be viewed as the contact plane and in flat belts, the flat belt surface can be directly viewed as the contact plane.

The traction elements are therefore exclusively responsible for transferring the traction forces. For higher loads, wider belts or belts of a higher capacity class can be used with larger belt division and stronger tension elements.

The belts are basically clearly wider than high in order to ensure a stable belt running on the sheave.

European patent publication 1 396 458 A2 describes an elevator arrangement wherein a flat belt of elastomer material is used as traction means with the flat belt being reinforced with reinforcement elements. United States patent publications 2007/0084671 and 2009/0166132 disclose an elevator facility having a V-ribbed belt.

Compared to ropes, belts afford the advantage that, on the one hand, the manipulation is easier because individual ropes do not have to be placed on the corresponding grooves of the traction sheave. Also, small traction sheave diameters can be used because the embedded reinforcement mostly has a small diameter. Furthermore, belts as traction means are virtually free of maintenance because no lubrication is required.

In addition to friction between traction sheave and elastomer, the transferable force is, however, also dependent upon the quality of the embedment of the reinforcement in the elastomer, that is, on the adherence capability between elastomer and reinforcement as well as upon the shearing strength of the elastomer.

Furthermore, at least two and as a rule, three to five, belts must be used in parallel, for example, in elevator systems for reasons of safety. The belt compared to a rope of the same strength is relatively wide because the belts contain a plurality of thin individual ropes. If now several belts are utilized in parallel, relatively wide traction sheaves and direction-changing sheaves are required.

In U.S. Pat. No. 6,739,433, traction means are disclosed for an elevator system which is configured as a profiled flat belt so that the surface, which is available for friction between the traction sheave and the belt, is somewhat greater. The transferable force is thereby somewhat higher than for a non-profiled flat belt. However, here too, the zone of the force transfer between the traction sheave and the traction means is still significantly spaced from the reinforcement so that the elastomer material of the flat belt is subjected to a relatively high shear.

SUMMARY OF THE INVENTION

It is the object of the invention to provide a traction device of the kind described initially herein which is simple to manipulate. High forces are transferable and the traction device permits a drive unit of lesser width compared to the known belt technology.

This object is realized in that the traction device is configured as a composite rope wherein parallel lying individual ropes have a first diameter with each rope having an elastomer layer of a predetermined thickness to form tension carriers which are each jacketed having a total diameter and the tension carriers are connected to each other over essentially their entire length by a one-sided elastomer connecting layer and the tension carriers engage in corresponding grooves of the traction sheave; the elastomer connecting layer is arranged on the side of the tension carriers which faces away from the side engaging in the grooves of the traction sheave; and, the tension carriers engage in the grooves of the traction sheave by at least 25% of their total diameter.

With this arrangement, the advantages of the belt technology can be combined with those of rope technology. The composite rope is simple to manipulate and is virtually as maintenance free as a belt. A high force transfer is provided because of the reinforcement which engages directly into the grooves of the traction sheave. The zone of the force transfer between the traction sheave and the reinforcement lies directly in the engagement zone. The resistance to shear of the jacketing is only of minimum significance because of the low thickness of the reinforcement.

Thin ropes can be used so that low traction sheave diameters and narrow traction sheaves are possible. For each composite rope, only one connecting element is needed for connecting, for example, to the elements to be lifted.

In a further embodiment of the invention, the thickness of the jacketing of the individual ropes lies in the range of 0.2 to 2 mm.

In a further embodiment of the invention, the thickness of the jacketing of the individual ropes lies in the range of 0.5 to 1 mm.

For this low thickness of the jacketing, the loading with respect to shear is especially low and the transferable tension force is high in correspondence thereto.

In a further embodiment of the invention, the jacketing is formed of an elastomer which differs from the elastomer of the connecting layer.

With the use of different elastomers, an especially large variation as to material combinations can be used so that the composite rope can be individually adjusted to a large number of applications.

In a further embodiment of the invention, the elastomer or the elastomers are preferably polyurethane or polyurethanes.

Polyurethane exhibits good friction characteristics as well as good adherence characteristics and is relatively insensitive to shear.

In a further embodiment of the invention, the jacketing of the individual ropes has an outer contour, which faces toward the traction sheave, whose cross section departs from a part-circular shape.

In a further embodiment of the invention, the cross section of the outer contour is configured to have a trapeze shape.

In a further embodiment of the invention, the cross section of the outer contour is configured to be quadratic.

In a further embodiment of the invention, the cross section of the outer contour is configured to be conical.

The configuration of the cross sections of the jacketing in different geometries affords the advantage that the composite rope can thereby be adapted to a multiplicity of traction sheave profiles.

In a further embodiment of the invention, the ratio of the total diameter (a) of the individual ropes to the total thickness of the composite rope (b) is $\leq 1$.

In a further embodiment of the invention, the connecting layer has a thickness (c) wherein $c \leq$ one half of the thickness (b) of the composite rope.

In a further embodiment of the invention, the individual ropes of the composite ropes are so spaced from each other that the distance of the centers of the individual ropes (t) is less than or equal to five times the diameter (d) of the individual ropes and is a minimum of d+1 mm.

These geometric relationships serve the optimal configuration of the composite rope so that the advantages compared to flat ropes remain and the individual ropes engage sufficiently far into the grooves of the traction sheave.

In a further embodiment of the invention, the connecting layer has a profiled surface on its side facing away from the traction sheave.

This profile functions for an improved guidance of the composite ropes when the composite ropes must be guided on their backs about rotation-changing rollers.

In another embodiment of the invention, each composite rope has at least four individual ropes.

In this way, the protection against twisting of the composite ropes is improved so that a reliable entry into the engaging zone of the traction sheave is ensured.

In a further embodiment of the invention, the individual ropes are arranged alternately between S-lay and Z-lay.

In a further embodiment of the invention, the number of individual ropes per composite rope is an even number.

The danger of a load-dependent twisting is especially low when using ropes alternating in Z-lay and S-lay. An even number improves this effect.

The individual ropes are made of steel in accordance with another embodiment of the invention.

Steel combines a high tensile strength and a high fatigue strength under reversed bending stresses with a good adherence capacity to the elastomers.

In a further embodiment of the invention, the diameters of the individual ropes lie between 1.5 mm and 8 mm.

In a further embodiment of the invention, the diameters of the individual ropes lie between 1.8 mm and 5.5 mm.

In this diameter range, an especially good ratio of minimum diameter of the traction sheave and high carrying load is given.

In a further embodiment of the invention, the sides of the composite ropes, which face away from the traction sheave, have a cover coating.

In another embodiment of the invention, the sides of the composite ropes, which face toward the traction sheave, have a cover coating.

In another embodiment of the invention, the cover coating is configured of a flat textile, for example, a fabric.

The friction as well as the resistance to wear of the composite rope can be improved with a coating of this kind.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
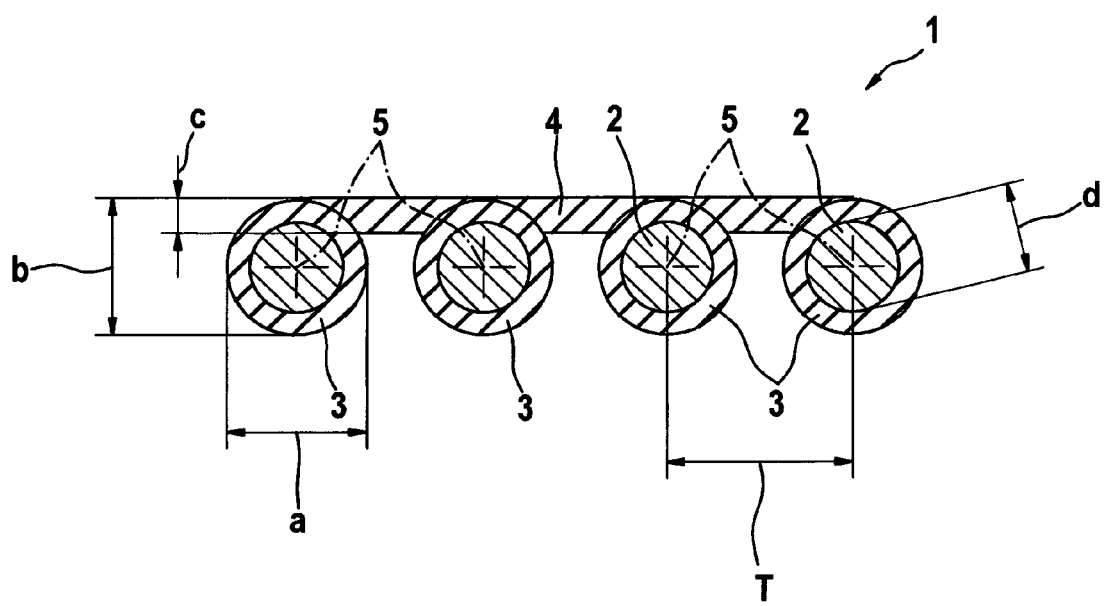
FIG. 1 shows a cross section through a composite rope according to the invention.

The composite rope 1, which is shown in cross section in FIG. 1, includes four individual ropes 2 having a diameter (d). Each individual rope 2 is encased with a jacket 3 of elastomer. The individual ropes 2 together with the jacket 3 form a total diameter (a).

The individual ropes 2 are fixedly connected to each other on one side by a connecting layer 4 having a thickness (c). The connection is generated by vulcanizing together the elastomer jacket 3 with the connecting layer 4 and the individual ropes 2. The connecting layer 4 is arranged on the side of the individual ropes 2 which faces away from the traction sheave (not shown).

The individual ropes 2 each have a center point 5. The center points 5 of the individual ropes 2 are spaced from each other by a dimension T. The composite rope has a total thickness (b).

Figure 2:
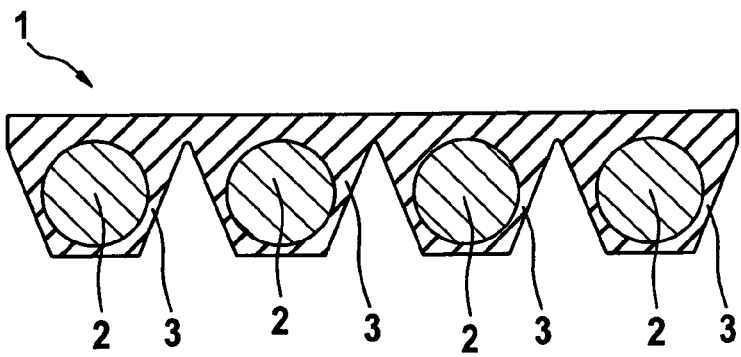
FIGS. 2 to 4 show composite ropes having different cross sections of the jacketing of the individual ropes.
Figure 3:
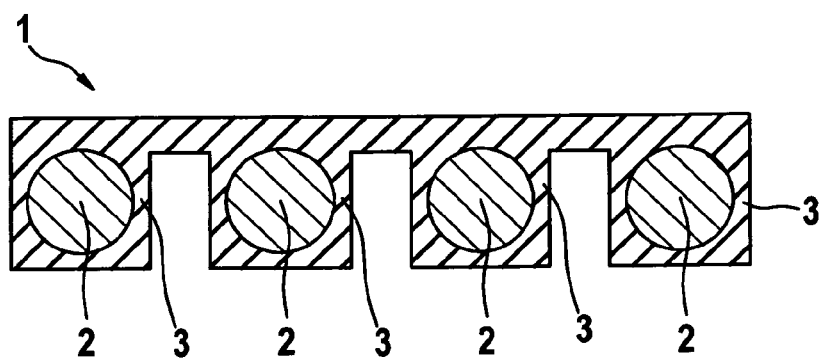
Figure 4:
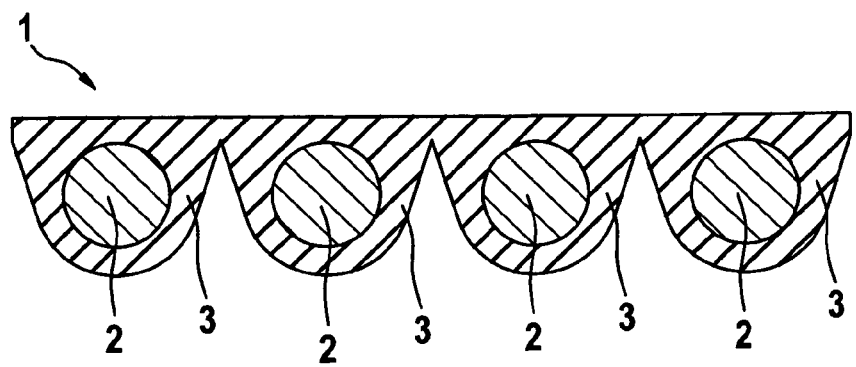

Composite ropes 1 are shown in FIGS. 2, 3 and 4 wherein the jackets 3 of the individual ropes 2 have a geometry departing from that of a circular shape. These geometries improve the engagement of the composite ropes in traction sheaves (not shown) which have a profile departing from the round shape. In this way, correspondingly shaped composite ropes 1 can be used, if needed, also on traction sheaves of V-ribbed belts.

Figure 5:
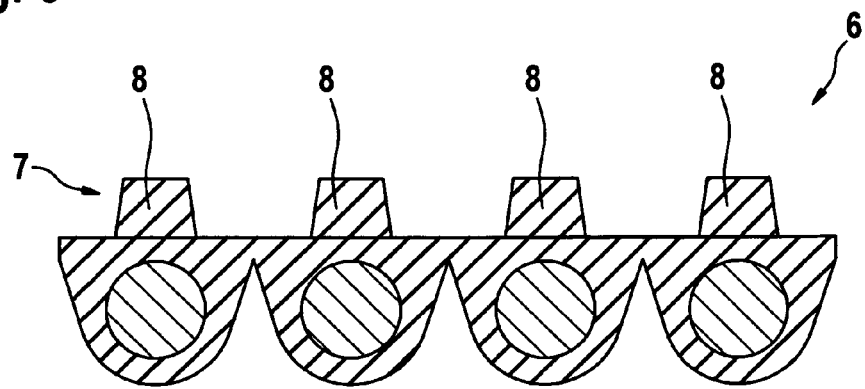
FIG. 5 shows a composite rope having a ribbed profile arranged on the back thereof; and, FIG. 6 shows a composite rope having a cover coating in engagement with a traction sheave.

In FIG. 5, a composite rope 6 is shown which has a ribbed profile 7 on a back side facing away from the traction sheave (not shown). The ribbed profile 7 comprises longitudinal ribs 8 spaced one from the other. The longitudinal ribs can, if required, engage in corresponding direction-changing rollers (not shown) and so improve the guidance of the composite rope 6.

Figure 6:
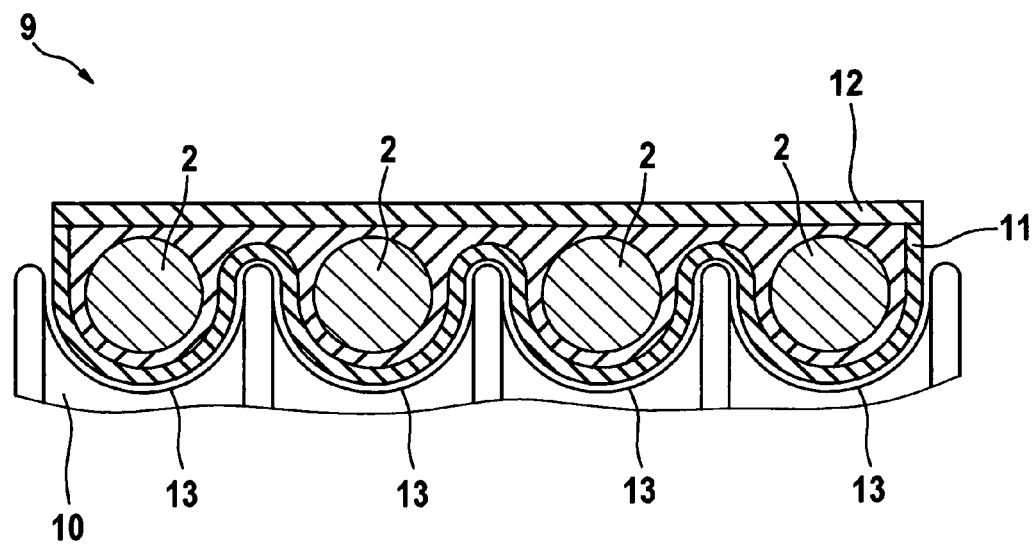

In FIG. 6, a composite rope 9 is shown which has a first cover coating 11 on the side thereof facing toward a traction sheave 10 and a second cover coating 12 on the side thereof facing away from the traction sheave 10. The traction sheave 10 has four grooves 13 with an almost semicircularly-shaped cross section wherein the individual ropes 2 engage. The individual ropes are jacketed with the elastomer 3 and are coated with the first cover coating 11.

The cover coatings 11 and 12 are configured of different fabrics so that the first cover coating 11 has an especially high resistance to wear (because the surface facilitates friction between composite rope 9 and traction sheave 10) and the second cover coating 12 has an especially smooth and wear resistant surface. The cover coatings 11 and 12 improve the characteristics of the composite rope 9 with respect to transferable loads and the service life of the composite rope 9.

It is understood that the foregoing description is that of the preferred embodiments of the invention and that various changes and modifications may be made thereto without departing from the spirit and scope of the invention as defined in the appended claims.

REFERENCE SYMBOL LIST (Part of the Description)
1 Composite rope
2 Individual ropes of the composite rope 1
3 Jacket of the individual ropes 2
4 Connecting layer
5 Center point of the cross section of the individual ropes 2
6 Composite rope having a back profile
7 Ribbed profile of the composite rope 6
8 Longitudinal ribs of the composite rope 6
9 Composite rope having cover coating
10 Traction sheave
11 First cover coating
12 Second cover coating
13 Grooves of the traction sheave 10

What is claimed is:

1. A traction device driveable by a traction sheave having a plurality of grooves, the traction device comprising:
    a plurality of mutually parallel individual ropes;
    a plurality of elastomeric jackets, each jacket sheathing one corresponding rope of said ropes to form respective tension carrier having an overall diameter and a predetermined length;
    a connecting layer connecting said tension carriers to each other over substantially all of said predetermined length so as to cause said connecting layer and said tension carriers to conjointly form a composite rope;
    each one of said tension carriers having a first side engaging a corresponding one of said grooves and a second side facing away from said grooves;
    said connecting layer being only disposed on said second side of each one of said tension carriers; and,
    each of said tension carriers engaging into a corresponding one of said grooves to at least 25% of said overall diameter,
    wherein said plurality of elastomeric jackets is configured from an elastomer which differs from an elastomer of said connecting layer.

2. The traction device of claim 1, wherein the jacket of each of said ropes has a thickness lying in the range of 0.2 to 2 mm.

3. The traction device of claim 2, wherein said thickness of said jacket of said individual ropes lies in the range of 0.5 to 1 mm.

4. The traction device of claim 1, wherein the jacket of said individual ropes has an outer contour which faces toward the traction sheave and said outer contour has a cross section configured to depart from a part-circular shape.

5. The traction device of claim 4, wherein said cross section of said outer contour is configured to be trapezoidal.

6. The traction device of claim 4, wherein said cross section of said outer contour is configured to be quadratic.

7. The traction device of claim 4, wherein said cross section of said outer contour is configured to be conical.

8. The traction device of claim 1, wherein said composite rope has a side facing away from said traction sheave; and, said side has a cover coating applied to said side of said composite rope.

9. The traction device of claim 8, wherein said cover coating is configured from a flat textile including a fabric.

10. The traction device of claim 1, wherein said composite rope has a side facing toward the traction sheave; and, said side of the composite rope has a cover coating.

11. The traction device of claim 10, wherein said cover coating is configured from a flat textile including a fabric.

12. The traction device of claim 1, wherein the elastomer of said jacket and the elastomer of said connecting layer is polyurethane.

13. The traction device of claim 1, wherein the elastomer of said jacket and the elastomer of said connecting layer are polyurethanes.

14. The traction device of claim 1, wherein the ratio of overall diameter (a) of each of said tension carriers to the total thickness (b) of said composite rope is less than one.

15. The traction device of claim 1, wherein said connecting layer has a thickness (c) wherein c≦half the thickness (b) of said composite rope.

16. The traction device of claim 1, wherein said individual ropes of said composite rope are spaced one from the other such that the distance (T) of the centers of said individual ropes is less than or equal to five times the diameter (d) of the individual ropes and is minimally d+1 mm.

17. The traction device of claim 1, wherein said connecting layer has a surface facing away from said traction sheave; and, said surface is a profiled surface.

18. The traction device of claim 1, wherein said composite rope has at least four individual ropes.

19. The traction device of claim 1, wherein said individual ropes are arranged alternately between S-lay and Z-lay.

20. The traction device of claim 1, wherein the number of said individual ropes per composite rope is an even number.

21. The traction device of claim 1, wherein said individual ropes are made of steel.

22. The traction device of claim 1, wherein the diameter of the individual ropes lies between 1.5 mm and 8 mm.

23. The traction device of claim 1, wherein the diameter of the individual ropes lies between 1.8 mm and 5.5 mm.

24. An elevator system comprising:
    a traction device;
    a traction sheave for driving said traction device;
    said traction device including:
    a plurality of mutually parallel individual ropes;
    a plurality of elastomeric layers jackets, each jacket sheathing one corresponding rope of said ropes to form respective tension carriers having an overall diameter and a predetermined length;
    a connecting layer connecting said tension carriers to each other over substantially all of said predetermined length so as to cause said connecting layer and said tension carriers to conjointly form a composite rope;
    said traction sheave having a plurality of grooves;
    each one of said tension carriers having a first side engaging a corresponding one of said grooves and a second side facing away from said grooves;

said connecting layer being only disposed on said second side of each one of said tension carriers;

each of said tension carriers engaging into a corresponding one of said grooves to at least 25% of said overall diameter; and, wherein said jackets are configured from an elastomer which differs from an elastomer of said connecting layer.

* * * * *

UNITED STATES PATENT AND TRADEMARK OFFICE
CERTIFICATE OF CORRECTION

PATENT NO. : 8,479,888 B2  
APPLICATION NO. : 12/588867  
DATED : July 9, 2013  
INVENTOR(S) : Göser Page 1 of 1

It is certified that error appears in the above-identified patent and that said Letters Patent is hereby corrected as shown below:

In Title Page:
Under (56) References Cited: add
-- 2007/0084671  4/2007  Ach
   2007/0093334  4/2007  Ach
   2009/0166132  7/2009  Ach --.

In the Specification:

In Column 5:
Line 41: add -- a -- between "form" and "respective".

In Column 6:
Line 56: delete "layers".

Signed and Sealed this
Twentieth Day of August, 2013

Teresa Stanek Rea
*Acting Director of the United States Patent and Trademark Office*